US012657471B2

(12) United States Patent
Wang et al.

(10) Patent No.: US 12,657,471 B2
(45) Date of Patent: Jun. 16, 2026

(54) HYBRID MODEL AND ARCHITECTURE SEARCH FOR AUTOMATED MACHINE LEARNING SYSTEMS

(71) Applicant: INTERNATIONAL BUSINESS MACHINES CORPORATION, Armonk, NY (US)

(72) Inventors: Dakuo Wang, Cambridge, MA (US); Kiran A. Kate, Chappaqua, NY (US); Arunima Chaudhary, Boston, MA (US); Abel Valente, Buenos Aires (AR); Ioannis Katsis, San Jose, CA (US); Chuang Gan, Cambridge, MA (US); Bei Chen, Blanchardstown (IE)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 17/207,664

(22) Filed: Mar. 20, 2021

(65) Prior Publication Data

US 2022/0300821 A1 Sep. 22, 2022

(51) Int. Cl.
| | |
|---|---|
| *G06F 17/13* | (2006.01) |
| *C12Q 1/6883* | (2018.01) |
| *G06F 9/38* | (2018.01) |
| *G06F 18/2113* | (2023.01) |
| *G06N 3/086* | (2023.01) |
| *G06N 5/045* | (2023.01) |
| *G16B 20/00* | (2019.01) |

(52) U.S. Cl.
CPC .......... *G06N 3/086* (2013.01); *G06F 9/3885* (2013.01); *G06F 18/2113* (2023.01); *G06N 5/045* (2013.01)

(58) Field of Classification Search
CPC .......... G06N 3/086; G06N 5/045; G06N 7/01; G06N 20/00; G06N 3/0455; G06N 3/0985; G06F 9/3885; G06F 18/2113; G06F 9/46; G06V 10/70
See application file for complete search history.

(56) References Cited

U.S. PATENT DOCUMENTS

| | | | |
|---|---|---|---|
| 11,379,710 B2 | 7/2022 | Wang et al. | |
| 11,514,361 B2 | 11/2022 | Salonidis et al. | |

(Continued)

FOREIGN PATENT DOCUMENTS

| | | |
|---|---|---|
| CN | 111459988 A | 7/2020 |
| JP | 2019079392 A | 5/2019 |
| WO | 2019215713 A1 | 11/2019 |

OTHER PUBLICATIONS

Anonymous, "Ranking and automatic selection of machine learning models"; IP.com IPCOM000252275D (2018); 34 pgs.
Mell, P. et al., "Recommendations of the National Institute of Standards and Technology"; NIST Special Publication 800-145 (2011); 7 pgs.
Yang, Y. et al., "Resource-Aware Pareto-Optimal Automated Machine Learning Platform"; arXiv:2011.00073v1 [cs.LG] (2020); 22 pgs.
He, Y. et al., "AMC: AutoML for Model Compression and Acceleration on Mobile Devices"; arXiv:1802.03494v4 [cs.CV] (2019); 17 pgs.

(Continued)

*Primary Examiner* — Brandon S Cole
(74) *Attorney, Agent, or Firm* — CHIP LAW GROUP

(57) ABSTRACT

A computer-implemented method of automatically generating a machine learning model includes identifying one or more visualization features of a dataset associated with a machine learning model selection process. A plurality of candidate machine learning pipelines are configured to perform respective optimizing strategies in parallel based on the identified visualization features. A machine learning model is automatically generated based on at least one of the generated candidate machine learning pipelines.

18 Claims, 11 Drawing Sheets

(56)        References Cited

U.S. PATENT DOCUMENTS

| | | | |
|---|---|---|---|
| 11,556,816 B2 | 1/2023 | Weidele et al. | |
| 11,620,550 B2 | 4/2023 | Wang et al. | |
| 11,763,084 B2 | 9/2023 | Wang et al. | |
| 11,861,469 B2 | 1/2024 | Kirchner et al. | |
| 11,989,237 B2 | 5/2024 | Wang et al. | |
| 12,026,613 B2 | 7/2024 | Wang et al. | |
| 2010/0205120 A1* | 8/2010 | Zou | G06F 18/40 |
| | | | 704/250 |
| 2011/0078426 A1* | 3/2011 | Stoitsev | G06Q 10/04 |
| | | | 718/107 |
| 2016/0132787 A1 | 5/2016 | Drevo et al. | |
| 2018/0165604 A1* | 6/2018 | Minkin | G06Q 10/06 |
| 2019/0258947 A1* | 8/2019 | Doddi | G06N 5/041 |
| 2019/0384640 A1* | 12/2019 | Swamy | G06F 9/453 |
| 2019/0394083 A1* | 12/2019 | Sglavo | G06F 11/1448 |
| 2020/0081916 A1* | 3/2020 | McShane | G06N 20/00 |
| 2020/0143246 A1* | 5/2020 | Li | G06F 16/26 |
| 2020/0387814 A1 | 12/2020 | Yellapragada et al. | |
| 2021/0034928 A1* | 2/2021 | Oh | G06F 18/10 |
| 2021/0224585 A1* | 7/2021 | Schmidt | G06F 18/285 |
| 2021/0334700 A1* | 10/2021 | Nagaraja | G06N 20/00 |
| 2022/0036246 A1* | 2/2022 | Chen | G06N 5/022 |

OTHER PUBLICATIONS

Wang, D. et al., "Human-AI Collaboration in Data Science: Exploring Data Scientists' Perceptions of Automated AI"; arXiv:1909.02309v1 [cs.HC] (2019); 24 pgs.

Drozdal, J. et al., "Trust in AutoML: Exploring Information Needs for Establishing Trust in Automated Machine Learning Systems"; arXiv:2001.06509v1 [cs.LG] (2020); 11 pgs.

Weidele, D. et al., "AutoAIViz: Opening the Blackbox of Automated Artificial Intelligence with Conditional Parallel Coordinates"; arXiv:1912.06723v3 [cs.LG] (2020); 5 pgs.

Wang, D. et al., "AutoAI: Automating the End-to-End AI Lifecycle with Humans-in-the-Loop"; IUI '20 Companion (2020); 2 pgs.

Billman, B. et al., "Automated Discovery in Managerial Problem Formulation: Formation of Causal Hypotheses for Cognitive Mapping"; Decision Sciences (1993); vol. 24:1; 19 pgs.

Blumenberg, L. et al., "Hypercluster: A Flexible Tool for Parallelized Unsupervised Clustering Optimization", BioRxiv (2020), 27 pages.

* cited by examiner

100A

400

500

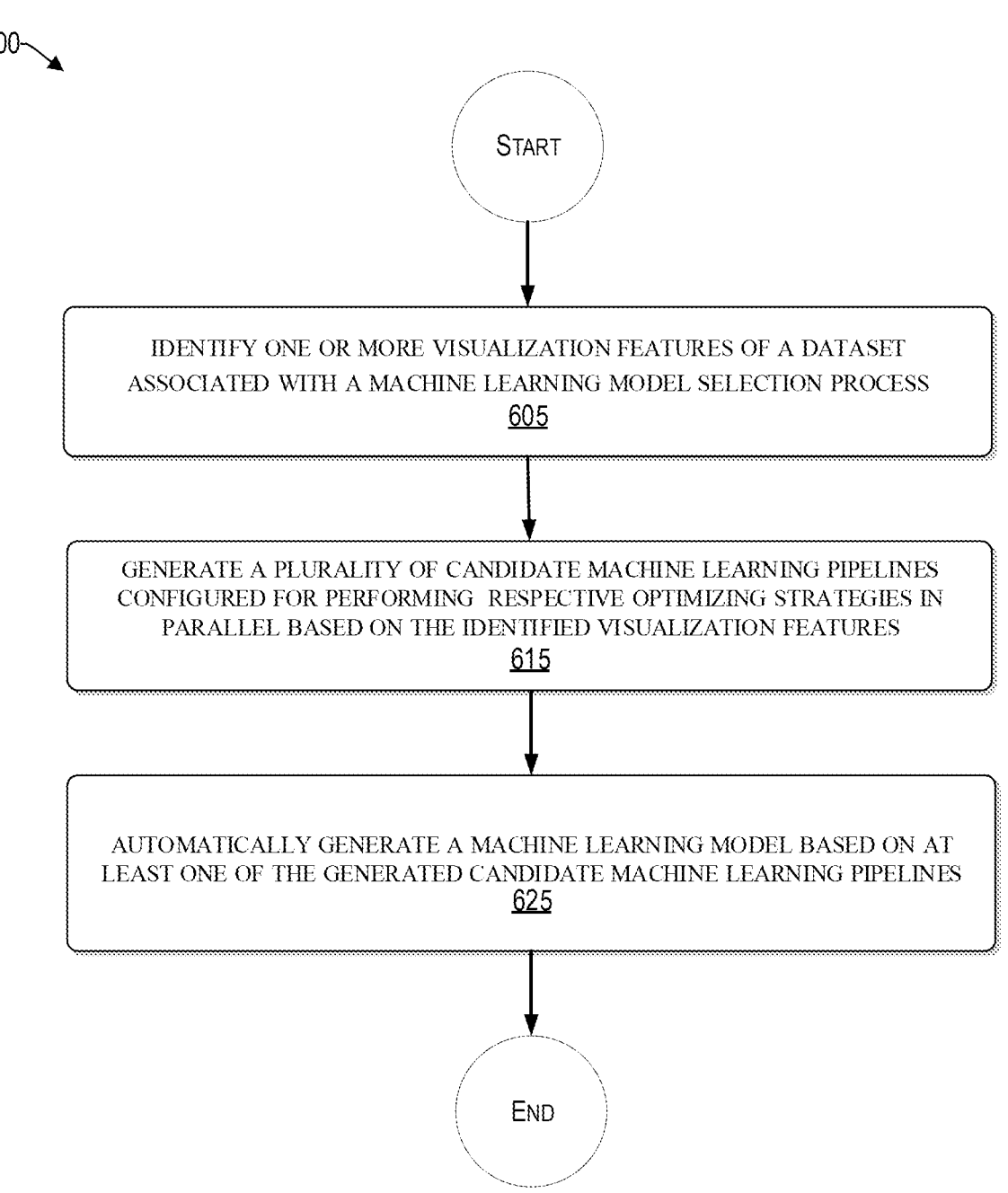

600

START

IDENTIFY ONE OR MORE VISUALIZATION FEATURES OF A DATASET
ASSOCIATED WITH A MACHINE LEARNING MODEL SELECTION PROCESS
605

GENERATE A PLURALITY OF CANDIDATE MACHINE LEARNING PIPELINES
CONFIGURED FOR PERFORMING RESPECTIVE OPTIMIZING STRATEGIES IN
PARALLEL BASED ON THE IDENTIFIED VISUALIZATION FEATURES
615

AUTOMATICALLY GENERATE A MACHINE LEARNING MODEL BASED ON AT
LEAST ONE OF THE GENERATED CANDIDATE MACHINE LEARNING PIPELINES
625

END

FIG. 6

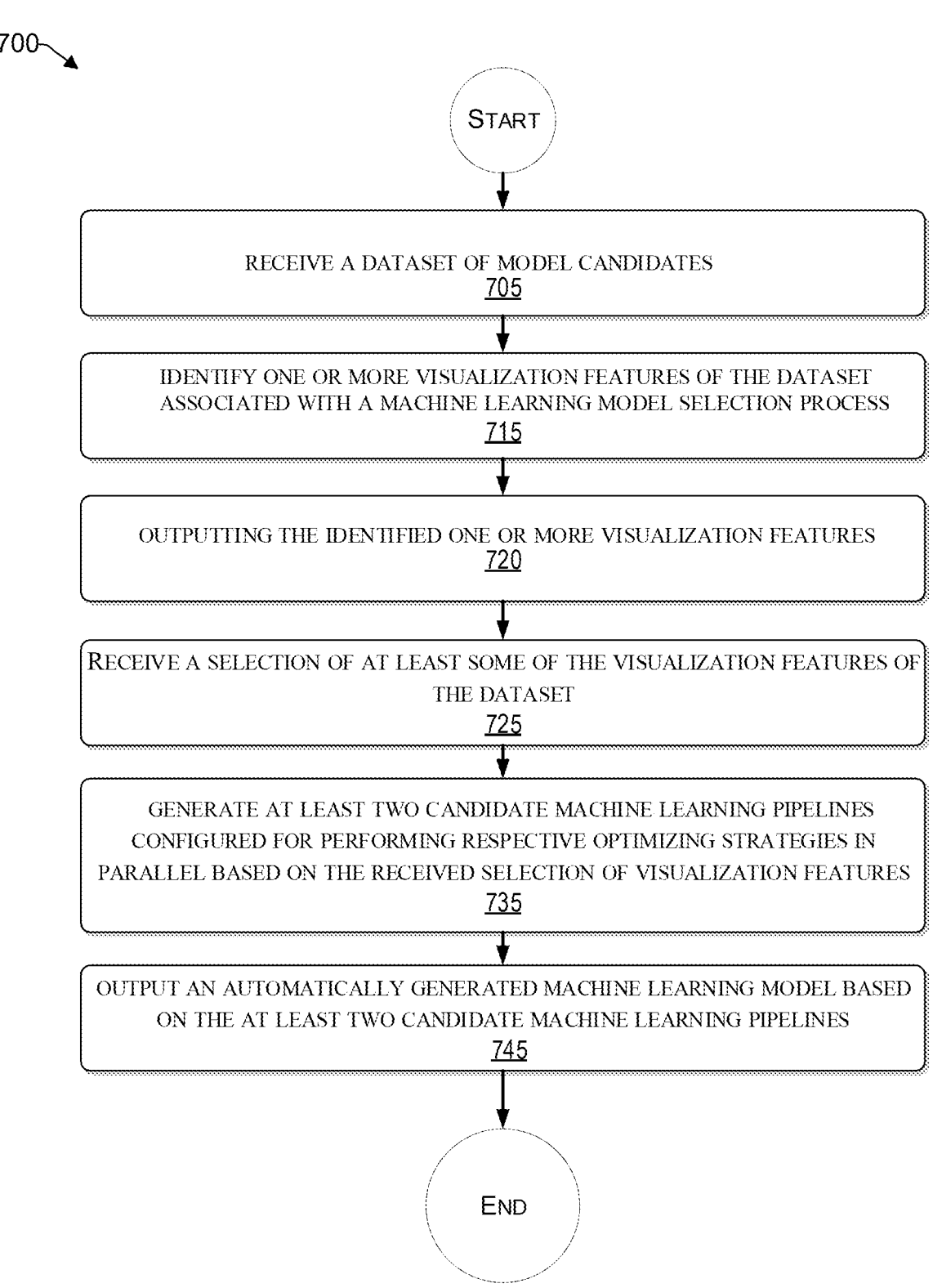

700

START

RECEIVE A DATASET OF MODEL CANDIDATES
705

IDENTIFY ONE OR MORE VISUALIZATION FEATURES OF THE DATASET
ASSOCIATED WITH A MACHINE LEARNING MODEL SELECTION PROCESS
715

OUTPUTTING THE IDENTIFIED ONE OR MORE VISUALIZATION FEATURES
720

RECEIVE A SELECTION OF AT LEAST SOME OF THE VISUALIZATION FEATURES OF
THE DATASET
725

GENERATE AT LEAST TWO CANDIDATE MACHINE LEARNING PIPELINES
CONFIGURED FOR PERFORMING RESPECTIVE OPTIMIZING STRATEGIES IN
PARALLEL BASED ON THE RECEIVED SELECTION OF VISUALIZATION FEATURES
735

OUTPUT AN AUTOMATICALLY GENERATED MACHINE LEARNING MODEL BASED
ON THE AT LEAST TWO CANDIDATE MACHINE LEARNING PIPELINES
745

END

HYBRID MODEL AND ARCHITECTURE SEARCH FOR AUTOMATED MACHINE LEARNING SYSTEMS

BACKGROUND

Technical Field

The present disclosure generally relates to systems and methods in Artificial Intelligence utilizing visualized information, and more particularly, to automated machine learning using visualized information.

Description of the Related Art

Interest in automated machine learning is growing in popularity as a way to increase the accuracy of predictive models and shorten the time to search for such models. The expertise and workflow of an expert, such as a data scientist, is mimicked to provide insights about the choice of models and feature generation. Pipelines are used to enable data sequences for transformation and correlation in a model for testing and evaluation. Most automated systems use exhaustive searching (also referred to as "brute force") to search data for predictive models.

SUMMARY

According to one embodiment, a computer-implemented method of automatically generating a machine learning model includes identifying one or more visualization features of a dataset associated with a machine learning model selection process. A plurality of candidate machine learning pipelines are configured for performing respective optimizing strategies in parallel based on the identified visualization features. A machine learning model is automatically generated based on at least one of the generated candidate machine learning pipelines.

According to an embodiment, a priority score is generated for each of the generated plurality of candidate machine learning pipelines and the automatic generation of the machine learning model is based on a candidate machine learning pipeline having the highest priority score.

According to an embodiment, a list of at least some of the generated plurality of candidate machine learning pipelines is output with a prompt for a selection of at least one of the candidate machine learning pipelines. The automatic generation of the machine learning model is based on a received selection of one of the candidate machine learning pipelines.

According to an embodiment, the dataset is analyzed to identify the one or more visualization features, and there is a prompting for a selection of the identified one or more visualization features to generate the plurality of candidate machine learning pipelines.

According to an embodiment, an ensemble of machine learning pipeline operations is generated from at least two candidate machine learning pipelines from the generated plurality of candidate machine learning pipelines.

According to an embodiment, a final predicted search result of the automatically generated machine learning model is output with an explanation.

According to an embodiment, a first pipeline of the at least two candidate machine learning pipelines is a Bayesian Optimized based model learning pipeline and a second pipeline is an evolutionary neural architecture search (NAS) pipeline.

According to an embodiment, the first pipeline performs a hyperparameter tuning operation, a feature extraction operation, a feature transformation operation, and a feature selection operation.

According to an embodiment, the second pipeline performs a hyperparameter optimization of neural network candidates and an evolution of a neural network architecture.

According to an embodiment, a third candidate machine learning pipeline is generated that is a neural network meta-learning pipeline.

According to an embodiment, a ranking of the plurality of candidate machine learning pipelines is performed based on one or more predetermined criteria.

According to an embodiment, there is a prompt for selection of the identified one or more visualization features of the dataset, and the plurality of candidate machine learning pipelines are generated based on the selection.

According to an embodiment, there is a prompt for selection of at least one of the generated plurality of candidate machine learning pipelines, and the machine learning model is generated based on the selection.

According to one embodiment, a computing device for generating learning models includes a processor and a memory coupled to the processor. The memory stores instructions to cause the processor to perform acts including identifying one or more visualization features of a dataset associated with a machine learning model selection process. A plurality of candidate machine learning pipelines are generated that are configured for performing respective optimizing strategies in parallel based on the identified visualization features. A priority score is generated for each of the generated plurality of candidate machine learning pipelines, and a machine learning model is automatically generated based on at least one of the generated candidate machine learning pipelines.

According to an embodiment, the computing device includes a communication interface coupled to the processor. The communication interface is configured to send and receive prompts for selection of pipeline candidates based on the identified visualization features According to one embodiment, a non-transitory computer readable storage medium tangibly embodying a computer readable program code having computer readable instructions that, when executed, causes a computer device to carry out a method of automatically generating a machine learning model. The method includes receiving a dataset of model candidates, and identifying one or more visualization features associated with a machine learning model selection process. There is a prompting for a selection of at least some of the identified visualization features. At least two candidate machine learning pipelines are generated and configured for performing respective optimizing strategies in parallel based on a received selection of visualization features. An automatically generated machine learning model is output based on the at least two candidate machine learning pipelines.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 6 is a flowchart illustrating a computer-implemented method of automated machine learning model generation, consistent with an illustrative embodiment.

FIG. 7 is another flowchart illustrating a computer-implemented method of automated machine learning model generation, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

The term "neural architecture search" (NAS) as used herein generally refers to a technique for automating the design of neural networks (NN). An "evolutionary NAS" as used herein generally refers to a changing of weights and hyperparameters as the search is being refined.

The term "hyperparameter optimization" as used herein generally refers to a selection of a set of hyperparameters for a machine learning algorithm. The hyperparameters are tuned to achieve a maximum performance on data within a certain amount of time.

The term "feature engineering" (FE) as used herein generally refers to preparing an input data set that is a best fit with a machine learning algorithm. FE enhances the performance of machine learning models and accelerates the time it takes to extract variables from data. FE is related to feature transformation, which includes the performing of scaling, converting, or modifying features.

The term "data visualization" as used herein generally refers to ascertaining how the data looks and what kind of correlation is held by the attributes of data. There can be techniques used including but not limited to multivariate plots that can determine an attribute distribution.

Automated machine learning (ML) systems that search for predictive models use large amounts of processing and rely on a pre-defined general framework to generate a large number of features. There are various distinct model search strategies including Bayesian Optimization, Reinforcement Learning, Evolutionary Techniques, Random Search, etc.

Figure 1A:
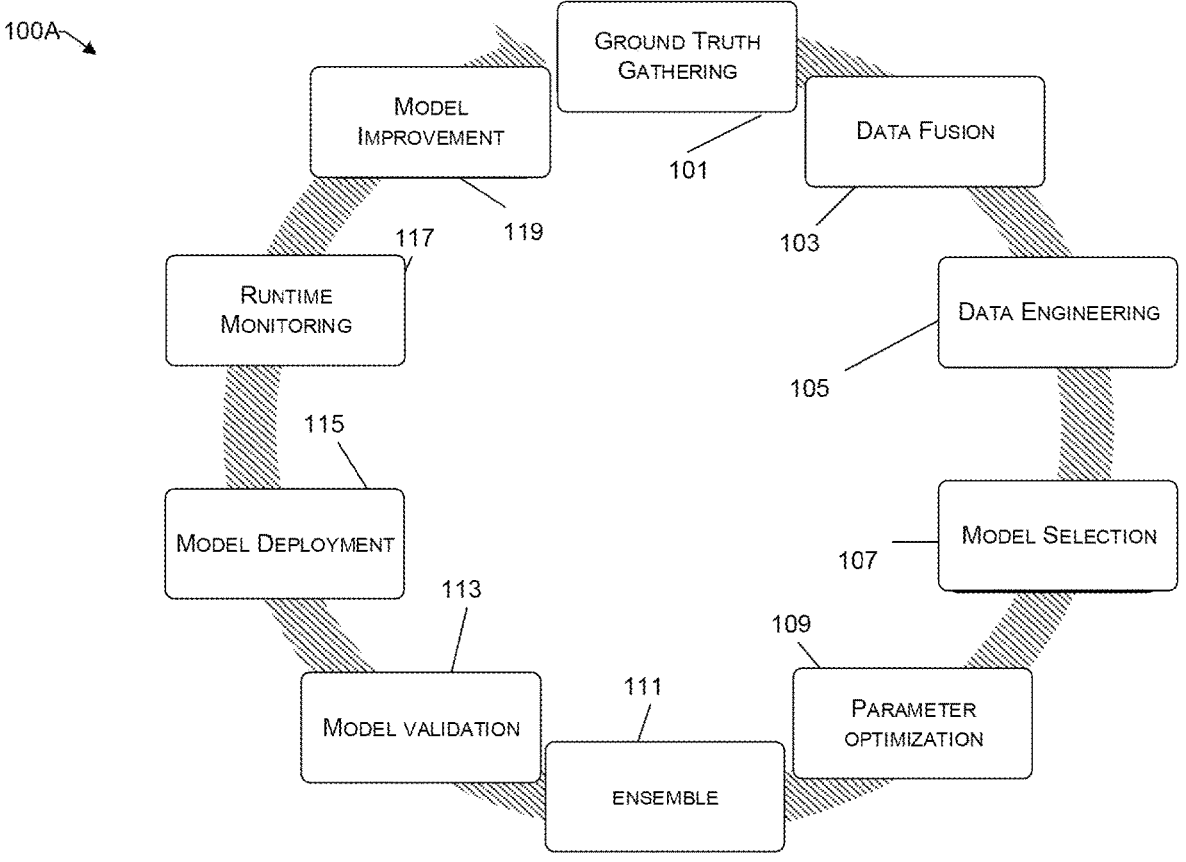
FIG. 1A is an overview illustrating some of the tasks for building machine learning models, consistent with an illustrative embodiment.

FIG. 1A is an overview 100A illustrating some of the tasks for building machine learning models, consistent with an illustrative embodiment. For example, a ground truth gathering 101 typically refers to the gathering of the proper data for testing the accuracy of a training set's classification in supervised learning techniques. The ground truth can be a label. A data fusion 103 is an aggregation of data, and data engineering 105 includes developing pipelines that transform and transport data. Model selection 107 is an operation to select a statistical model from a set of candidates. Parameter optimization 109 is a task to identify optimal settings for a model's predictions and observed data training labels. An Ensemble 111 is a combined use of tools and algorithms to form an optimal single predictive model. Model validation 113 is an estimate of a model's efficiency after applying the model to training data. Model deployment 115 is the integration of a machine learning model into a production environment. Runtime monitoring 117 permits the observation of processor use and memory consumption, and model improvement 119 includes the tuning of hyperparameters to increase the efficiency and accuracy of predictive models.

According to the present disclosure, a hybrid architecture is provided that accelerates and improves the model search result by searching two pipelines using multiple optimizing strategies in parallel. For example, a Bayesian Optimization for classic machine learning models is performed by one pipeline, and a reinforcement learning operation searching neural network models is performed by another pipeline. The applicability and performance of the search depends on the underlying search space. Hybrid optimization strategies may include an arrangement of a conventional model pipeline composition with another pipeline having neural network-based architectures.

Figure 1B:
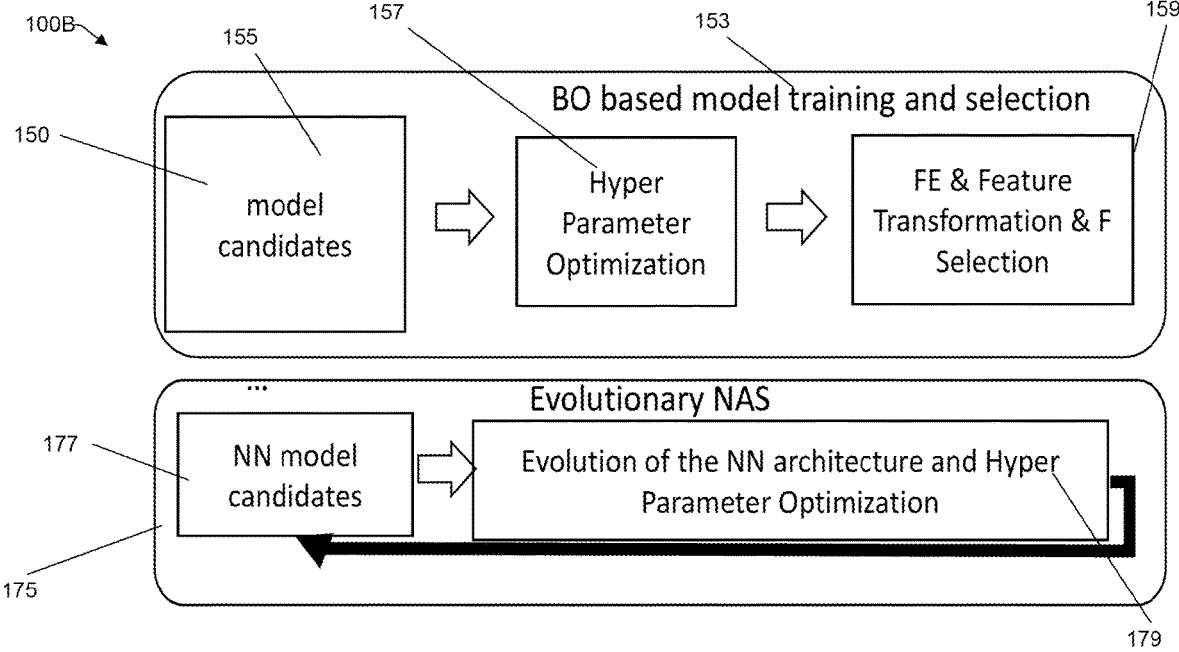
FIG. 1B shows a hybrid optimization pipeline architecture, consistent with an illustrative embodiment.

FIG. 1B shows a hybrid optimization pipeline architecture 100B, consistent with an illustrative embodiment. The model search result can be accelerated and improved in accuracy through searching both pipelines using multiple optimizing strategies in parallel. Pipelines 150, 175 are configured to operate according to different strategies. The pipeline 150 is configured for a Bayesian Optimization (BO) model training and selection. The pipeline 175 is configured to operate as an evolutionary Neural Architecture Search (NAS) pipeline. Pipeline 150 receives model candidates 155, performs hyperparameter optimization 157 followed by feature engineering and feature transformation selection 159. Pipeline 175 is configured for receiving candidates 177 from a neural network and utilizing the neural network model candidates 177 for the evolution of the neural network architecture and hyperparameter optimization 179. It is determined which pipeline output to select, for example, by pipeline ranking. An ensemble of pipeline operations may be provided.

The computer-implemented method and computing device of the present disclosure provides a number of improvements in the field of generating machine learning models and improving the accuracy and time expenditures in the fabrication of machine learning models through an improved model search result.

The computer-implemented method and computing device of the present disclosure also improves the efficiency of computer operations by reducing unnecessary computer processing due at least because of more accurate model selection, parameter optimizations, model validations, and deployment. A reduction in processing overhead and storage can be realized, with a reduction in power consumed.

Additional advantages of the computer-implemented method and device of the present disclosure are disclosed herein.

Example Embodiment of Generating a Machine Learning Model

Figure 2:
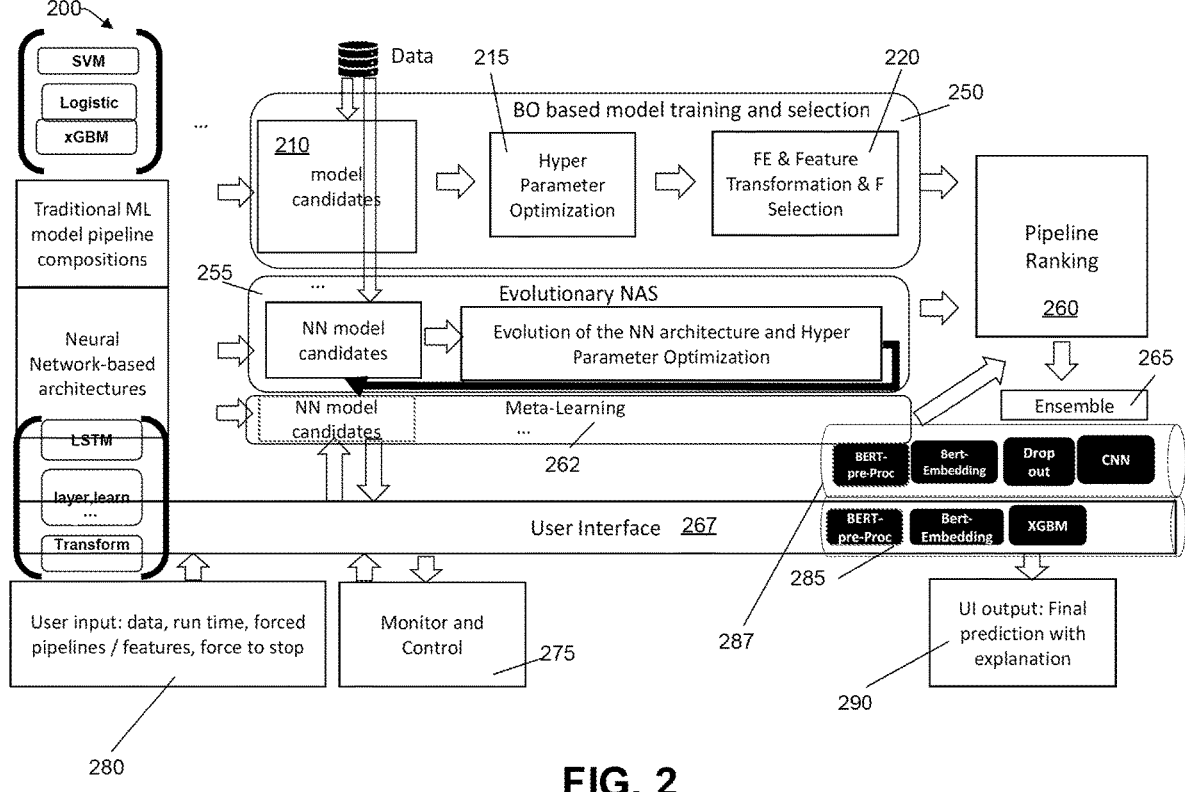
FIG. 2 illustrates an architecture of a workflow for automated machine learning model generation, consistent with an illustrative embodiment.

FIG. 2 illustrates an architecture 200 of a workflow for automated machine learning model generation, consistent with an illustrative embodiment. FIG. 2 shows a hybrid architecture that includes a plurality of pipeline generation and selection methods 250, 255, and 262. The pipeline method 250 is a Bayesian Optimization model training and selection method that includes model candidates 210, and a hyperparameter optimization function 215. The pipeline method 250 also includes a multi-function instruction set for feature extraction, feature transformation, and feature selection 220. The method may operate as a traditional model pipeline training and selection method in parallel at least with the evolutionary NAS method 255 and the meta-learning method 262. The NAS method 255 and the meta-learning method 262 receive neural network model candidates. All of the methods have bidirectional execution of functions to optimize the candidate model pipelines in terms of reduced redundancy and improved accuracy in the search. The candidate model pipelines are then ranked by a ranking function 260. The ranking may be in terms of, for example, accuracy, time of execution, or a combination of accuracy and time of execution.

An ensemble function 265 is configured to group at least some of the pipeline operations for an enhanced operation in terms of accuracy. A user interface may be configured to communicate with another device, such as a server, storage, or a user device. For example, the user interface 267 may be used for communication with monitor and control operations 275. A user input device 280 may also be used to control the settings of the operations to automatically generate a machine learning model. In this illustrative embodiment, one of the two models 285 is an example model pipeline generated from 250 BO-based model selection method, and the other model 287 is another example pipeline result coming out of 255 NAS both in a final form. The pipelines 285, 287 are provided in an output as a final prediction 290 with an explanation.

Figure 3:
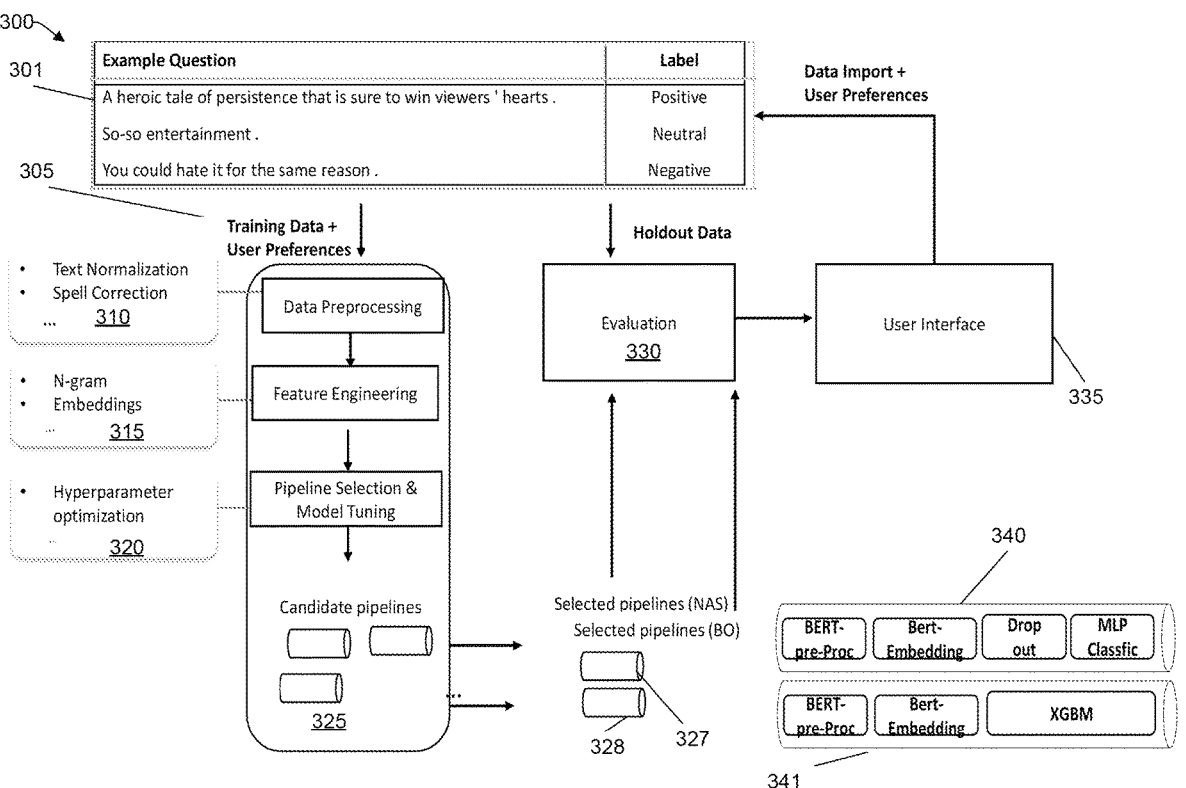
FIG. 3 illustrates an algorithm workflow for automated machine learning model generation, consistent with an illustrative embodiment.

FIG. 3 illustrates an algorithm workflow 300 for automated machine learning model generation, consistent with an illustrative embodiment. FIG. 3 shows some training data 310 in the form of phrases that are labeled as positive, neutral, or negative. The training data 310 and user preferences 305 are data preprocessed and feature engineered 325. For example, the data preprocessing operations may be one or both of text normalization and spelling correction. The feature engineering operation may be n-gram and embeddings 315. A pipeline selection and model tuning can be performed using hyperparameter optimization 320. The candidate pipelines include an example model pipeline result generated by NAS method 327 and an example model pipeline result generated by BO method 328). The selected NAS pipeline 327 includes components 340, and the selected BO pipeline 328 includes the components 341. An evaluation operation module 330 may execute a test, for example, regarding the accuracy and execution times of the pipelines 327, 328. Finally, the evaluation operation module provides the evaluation information regarding the pipelines to a user interface device 335.

Figure 4:
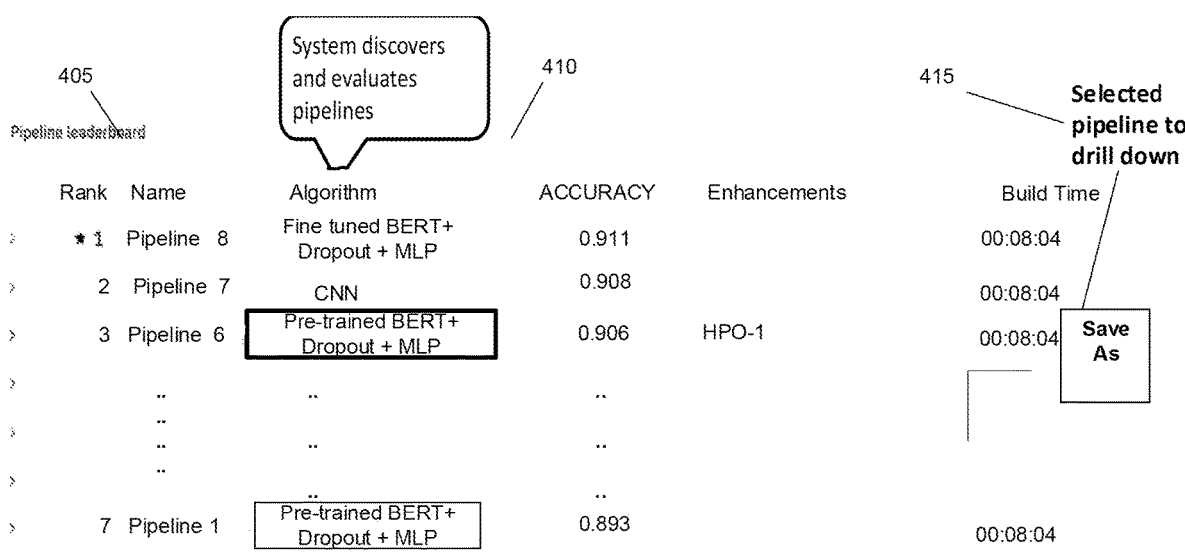
FIG. 4 is a display of ranked pipelines for automated machine learning model generation, consistent with an illustrative embodiment.

FIG. 4 illustrates a display 400 of ranked pipelines for automated machine learning model generation, consistent with an illustrative embodiment. For example, a leaderboard 405 shows the ranked candidate pipelines. There is a column 410 identifying the algorithms performed by each of pipelines. The candidate pipelines are ranked 1 through 7 in terms of accuracy. The ranked pipelines are selectable as shown by the selected pipeline 6 (ranked as $3^{rd}$ in terms of accuracy) is selected (as shown by the box around the pipeline, to permit a drill-down of its ranking and other criteria.

Figure 5:
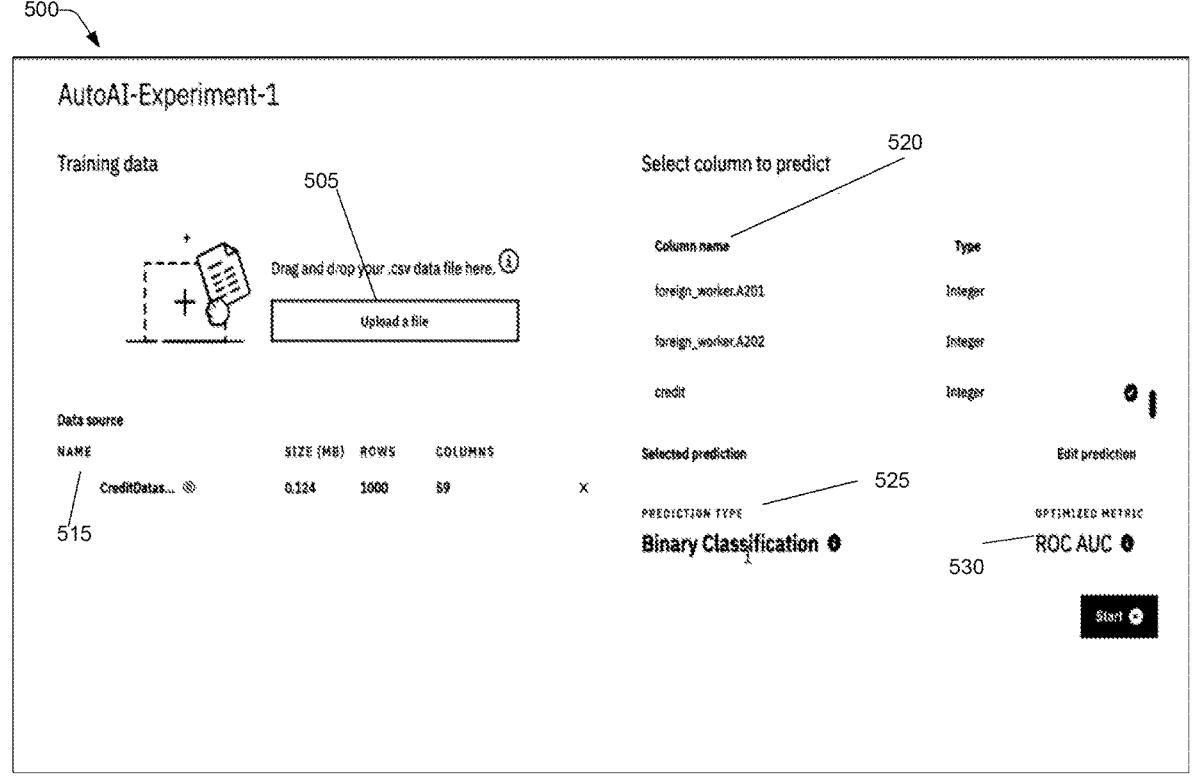
FIG. 5 is a screenshot illustrating task selection and an optimization metric, consistent with an illustrative embodiment.

FIG. 5 is a screenshot 500 illustrating task selection and an optimization metric, consistent with an illustrative embodiment. FIG. 5 shows an example screen that permits a drag and drop 505 of data to be uploaded for training data. The data source is displayed with a name 515. There is a selectable column field 520 that can be selected by a column name. There are additional fields shown regarding the prediction type and an optimized metric 530.

Example Process

With the foregoing overview of the example architecture, it may be helpful now to consider a high-level discussion of example processes. To that end, in conjunction with FIGS. 1 to 5, FIGS. 6 and 7 depict respective flowcharts 600, 700 illustrating various aspects of a computer-implemented method, consistent with an illustrative embodiment. Each of the FIGS. 6 and 7 are shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

FIG. 6 is a flowchart 600 illustrating a computer-implemented method of automated machine learning model generation, consistent with an illustrated embodiment.

At operation 605, one or more visualization features of a dataset associated with a machine learning model selection process are identified. The dataset can include model candidates from a traditional model pipeline source, such as a support-vector machine (SVM) algorithm, a gradient boost machine (XGBM) (e.g., to produce a prediction model in the form of an ensemble of weak prediction models), and logistics (see FIG. 2). There may also be neural network candidates in a pipeline operated using evolutionary NAS, as discussed herein above.

At operation 615, a plurality of candidate machine learning pipelines are generated. The pipelines are configured to perform respective optimizing strategies in parallel based on the identified visualization features. The generation of a plurality of machine learning pipelines is used for the hybrid architecture to search multiple pipelines in parallel.

At operation 625, a machine learning model is automatically generated based on at least one of the generated candidate machine learning pipelines. The multiple pipeline generation, such as described in operation 615, permits a more accurate and faster generation of the machine learning model.

FIG. 7 is a flowchart 700 illustrating a computer-implemented method of automated machine learning model generation, consistent with an illustrated embodiment.

At operation 705, a dataset of model candidates is received. The model candidates may be the same as discussed in FIGS. 2 and 6. At operation 715, one or more visualization features of the dataset associated with a machine learning model selection process are identified. At operation 720, the identified visualization feature is output, for example, by a display screen, or transmitted to a server or a memory for storage. The identified visualization feature may be output to a user device.

At operation 725, a selection is received of at least some of the visualization features that were output. At operation 735, at least two candidate machine learning pipelines configured for performing respective optimizing strategies in parallel are generated based on the received selection of visualization features.

At operation 745, an automatically generated machine learning model based on the at least two candidate machine learning pipelines is output. The machine learning model is generated with a more accurate predictive capability in a shorter amount of time due to the hybrid architecture of multiple candidate pipelines for searching.

Example Particularly Configured Computer Hardware Platform

Figure 8:
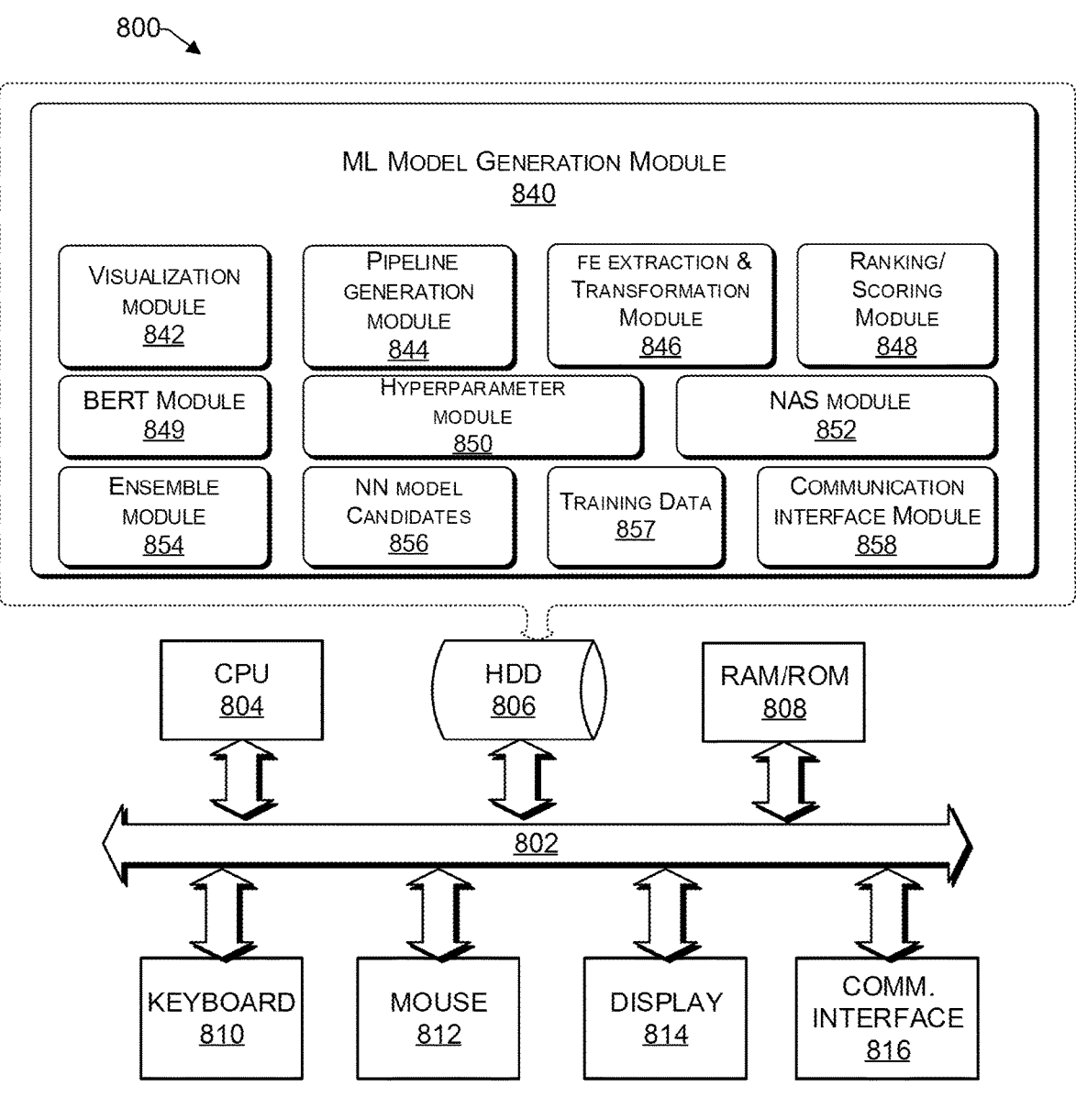
FIG. 8 is a functional block diagram illustration of a computer hardware platform, consistent with an illustrative embodiment.

FIG. 8 provides a functional block diagram illustration 800 of a computer hardware platform. In particular, FIG. 8 illustrates a particularly configured network or host computer platform 800, as may be used to implement the methods shown in FIGS. 6 and 7.

The computer platform 800 may include a central processing unit (CPU) 804, a hard disk drive (HDD) 806, random access memory (RAM) and/or read-only memory (ROM) 808, a keyboard 810, a mouse 812, a display 814, and a communication interface 816, which are connected to a system bus 802. The HDD 806 can include data stores.

In one embodiment, the HDD 806 has capabilities that include storing a program that can execute various processes, such as machine learning, predictive modeling, classification, updating model parameters. The ML model generation module 840 is configured to generate a machine learning model based on at least one of the generated candidate machine learning pipelines. While the modules 842 through 858 are shown as individual modules for illustrative purposes, multiple functionalities may be combined into fewer modules than shown.

A visualization module 842 is configured to perform data visualization to ascertaining what kind of correlation is held by the attributes of data and construct one or more data plots. The pipeline generation module 844 is configured to generate multiple pipelines in a hybrid architecture. For example, a Bayesian Optimized (BO) pipeline and an Evolutionary NAS pipeline. Other pipelines such as a meta-learning pipeline may also be generated. The Feature extraction and feature transformation module 846 is configured to reduce a number of features used to describe a data set, and to change features into a form suitable for input to a machine learning algorithm. The ranking/scoring module 848 is configured to generate a priority score if the various candidate pipelines are generated. Such pipelines may be ranked such as shown in FIG. 4. The Bidirectional Encoder Representation from Transformers (BERT) module 849 is used in deep learning neural networks and may utilize Natural Language Processing (NLP) to assist computer devices to understand ambiguous language in text through the use of surrounding text to establish context.

With continued reference to FIG. 8, the hyperparameter module 850 is configured to perform optimizations to achieve a maximum performance of a data search within a certain amount of time. The NAS module 852 assists in automating the design of neural networks (NN). For example, there can be a changing of weights and hyperparameters as a search is being refined. The ensemble module 854 is configured to form an optimal single predictive model through a combined use of tools and algorithms. The NN candidate and training model 856 is configured to provide neural network model candidates. The training data module 857 is configured to provide the training data to teach the ML model to perform. The communication interface module 858 can be used to communicate with a network, peripherals, an external device, and possibly a user to send and receive data and instructions.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 9:
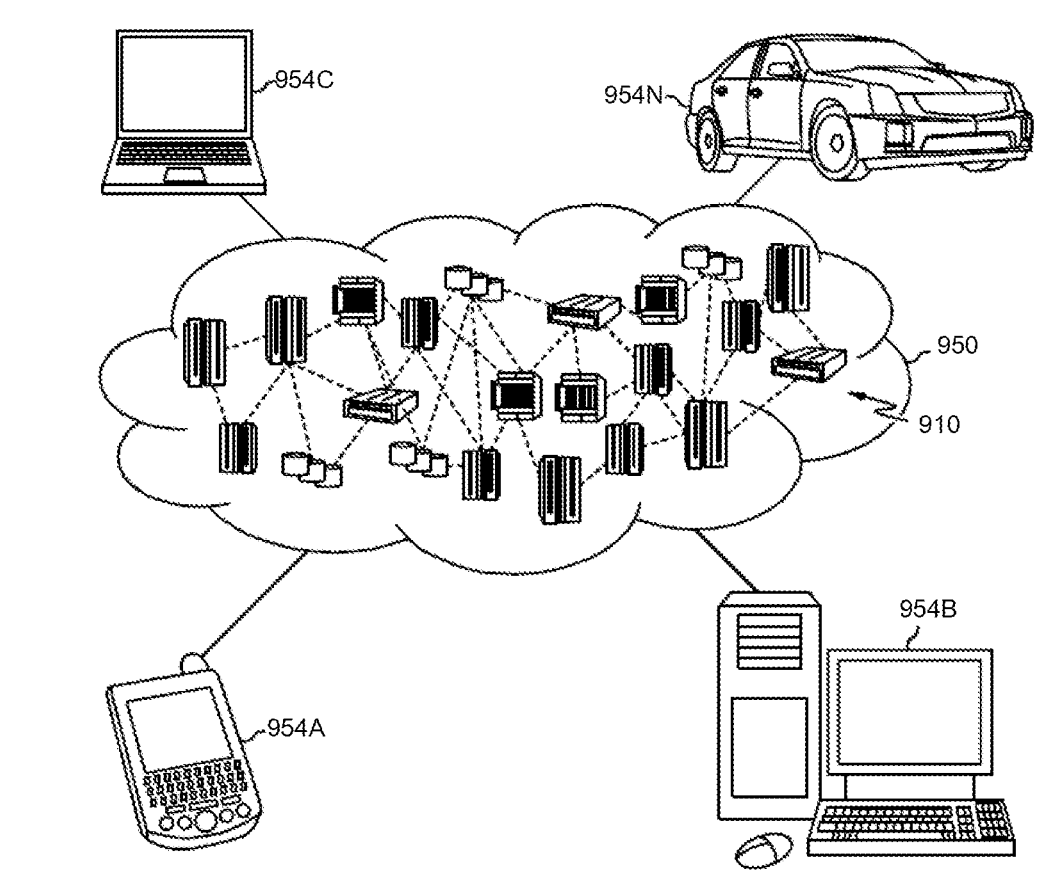
FIG. 9 depicts an illustrative cloud computing environment, consistent with an illustrative embodiment.

Referring now to FIG. 9, an illustrative cloud computing environment 900 utilizing cloud computing is depicted. As shown, cloud computing environment 900 includes cloud 950 having one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms, and/or software as services for which a cloud consumer does not need to maintain resources on a local computing device. It is understood that the types of computing devices 954A-N shown in FIG. 9 are intended to be illustrative only and that computing nodes 910 and cloud computing environment 900 can communicate with any type of computerized device over any type of network and/or network addressable connection (e.g., using a web browser).

Figure 10:
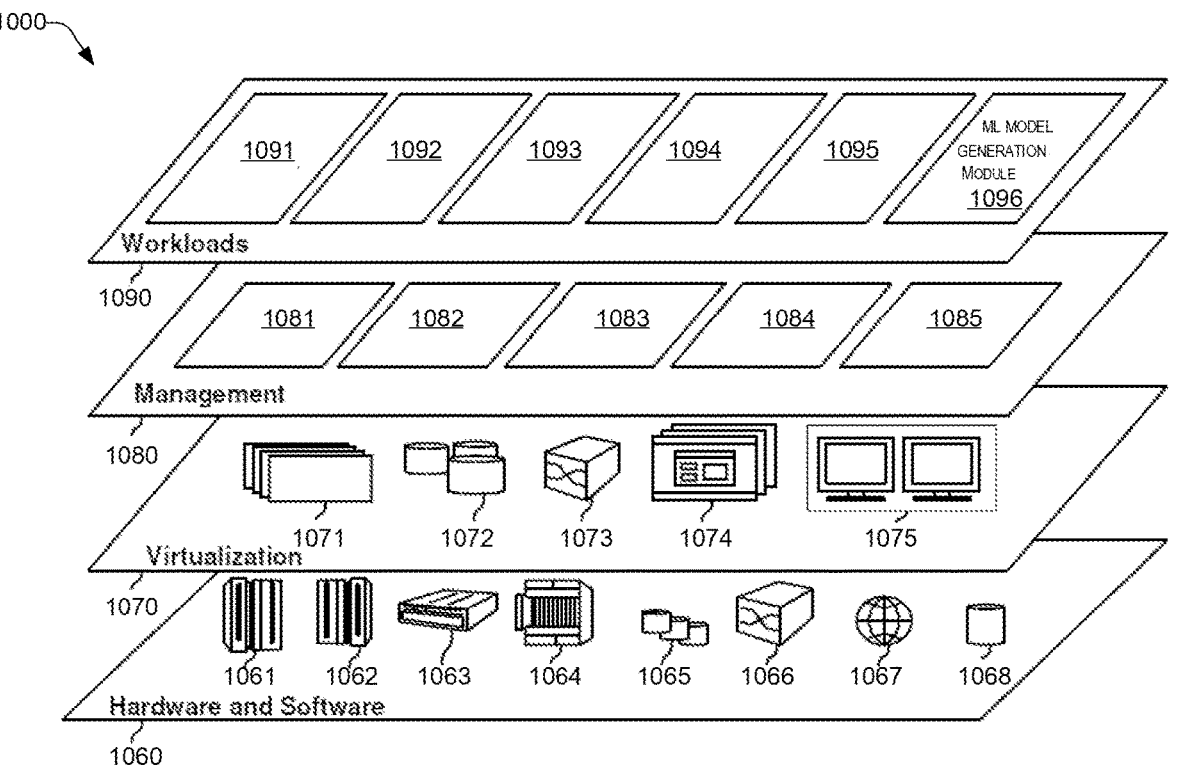
FIG. 10 depicts a set of functional abstraction layers provided by a cloud computing environment, consistent with an illustrative embodiment.

Referring now to FIG. 10, a set of functional abstraction layers 1000 provided by cloud computing environment 1000 (FIG. 10) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 include hardware and software components. Examples of hardware components include: mainframes 1061; RISC (Reduced Instruction Set Computer) architecture-based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and an ML model generation module 1096 configured to perform automatically generation an ML using a hybrid pipeline architecture, as discussed herein above.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of automatically generating a machine learning model, the computer-implemented method comprising:

identifying one or more visualization features in a plot of a dataset associated with a machine learning model selection process;

generating at least two candidate machine learning pipelines, wherein the generating includes selection of weights and hyperparameters for each of the at least two candidate machine learning pipelines, a first pipeline of the at least two candidate machine learning pipelines includes a first machine learning algorithm, a hyperparameter optimization function, and a multi-function instruction set for feature extraction, feature transformation, and feature selection, and a second pipeline of the at least two candidate machine learning pipelines includes a second machine learning algorithm, and a neural network (NN) architecture and hyperparameter optimization function;

tuning the hyperparameters of the first machine learning algorithm and the second machine learning algorithm in parallel by a hybrid architecture based on:

the identified one or more visualization features in the plot, and bidirectional execution of the hyperparameter optimization function, the multi-function instruction set, and the NN architecture and hyperparameter optimization function;

automatically generating the machine learning model based on at least one of the at least two candidate machine learning pipelines configured to perform the tuning of the hyperparameters, wherein:

the first pipeline, configured to perform the tuning of the hyperparameters, corresponds to a Bayesian Optimized based model learning pipeline, the second pipeline, configured to perform the tuning of the hyperparameters, corresponds to an evolutionary neural architecture search (NAS) pipeline, and the hybrid architecture comprises the first pipeline and the second pipeline, and is configured to increase a computational accuracy of a computing device by:

searching the first pipeline and the second pipeline in parallel;

generating a priority score for each of the at least two candidate machine learning pipelines based on accuracy and build time to conserve computation resources; and generating the machine learning model by selecting a candidate machine learning pipeline of the at least two candidate machine learning pipelines that has a highest priority score among the at least two candidate machine learning pipelines;

executing model deployment to integrate the generated machine learning model into a production environment; and executing runtime monitoring to monitor a processor use and a memory consumption of the generated machine learning model.

2. The computer-implemented method of claim 1, further comprising:

outputting a list of at least some of the at least two candidate machine learning pipelines; and prompting for a selection of at least one candidate machine learning pipeline of the output list, wherein the automatic generation of the machine learning model is based on a received selection of the at least one candidate machine learning pipeline.

3. The computer-implemented method of claim 1, further comprising:

analyzing the dataset to identify the one or more visualization features; and prompting for a selection of the identified one or more visualization features to generate the at least two candidate machine learning pipelines.

4. The computer-implemented method of claim 1, further comprising outputting a final predicted search result of the automatically generated machine learning model with an explanation.

5. The computer-implemented method of claim 1, further comprising generating an ensemble of machine learning pipeline operations from the at least two candidate machine learning pipelines.

6. The computer-implemented method of claim 1, further comprising performing, by the second pipeline, an evolution of a neural network architecture.

7. The computer-implemented method of claim 1, further comprising generating a third candidate machine learning pipeline comprising a neural network meta-learning pipeline.

8. The computer-implemented method of claim 1, further comprising ranking the at least two candidate machine learning pipelines based on a predetermined criterion.

9. The computer-implemented method of claim 1, further comprising:

prompting for a selection of the identified one or more visualization features of the dataset; and generating the at least two candidate machine learning pipelines based on a received selection of the identified one or more visualization features.

10. The computer-implemented method of claim 1, further comprising:

prompting for a selection of at least one candidate machine learning pipeline of the at least two candidate machine learning pipelines; and generating the machine learning model based on a received selection of the at least one candidate machine learning pipeline.

11. A computing device for generating a machine learning model, the computing device comprising:

a processor; and a memory coupled to the processor, the memory storing instructions to cause the processor to perform operations comprising:

identifying one or more visualization features in a plot of a dataset associated with a machine learning model selection process;

generating at least two candidate machine learning pipelines, wherein the generating includes selection of weights and hyperparameters for each of the at least two candidate machine learning pipelines, a first pipeline of the at least two candidate machine learning pipelines includes a first machine learning algorithm, a hyperparameter optimization function, and a multi-function instruction set for feature extraction, feature transformation, and feature selection, and a second pipeline of the at least two candidate machine learning pipelines includes a second machine learning algorithm, and a neural network (NN) architecture and hyperparameter optimization function;

tuning the hyperparameters of the first machine learning algorithm and the second machine learning algorithm in parallel by a hybrid architecture based on:

the identified one or more visualization features, and bidirectional execution of the hyperparameter optimization function, the multi-function instruction set, and the NN architecture and hyperparameter optimization function;

generating a priority score for each of the at least two candidate machine learning pipelines based on accuracy and build time to conserve computation resources;

automatically generating the machine learning model based on at least one of the at least two candidate machine learning pipelines, wherein:

the first pipeline, configured to perform the tuning of the hyperparameters, corresponds to a Bayesian Optimized based model learning pipeline, the second pipeline, configured to perform the tuning of the hyperparameters, corresponds to an evolutionary neural architecture search (NAS) pipeline, and the hybrid architecture comprises the first pipeline and the second pipeline, and is configured to increase a computational accuracy of the computing device by:

outputting a list of at least some of the at least two candidate machine learning pipelines; and prompting for a selection of at least one candidate machine learning pipeline of the output list, wherein the automatic generation of the machine learning model is based on a received selection of the at least one candidate machine learning pipeline;

executing model deployment to integrate the generated machine learning model into a production environment; and executing runtime monitoring to monitor a processor use and a memory consumption of the generated machine learning model.

12. The computing device of claim 11, wherein the operations further comprise:

generating an ensemble of machine learning pipeline operations from the at least two candidate machine learning pipelines.

13. The computing device of claim 11, wherein the operations further comprise generating a third candidate machine learning pipeline comprising a neural network meta-learning pipeline.

14. The computing device of claim 11, further comprising a communication interface coupled to the processor, the communication interface configured to send and receive prompts for the selection of the at least one candidate machine learning pipeline based on the identified one or more visualization features.

15. A non-transitory computer readable storage medium tangibly embodying a computer readable program code having computer readable instructions that, when executed, causes a computer device to execute operations for automatically generating a machine learning model, the operations comprising:

receiving a dataset of model candidates;

identifying one or more visualization features in a plot of the dataset associated with a machine learning model selection process;

outputting the identified one or more visualization features in the plot;

receiving a selection of at least one of the output one or more visualization features of the dataset;

generating at least two candidate machine learning pipelines, wherein the generating includes selection of weights and hyperparameters for each of the at least two candidate machine learning pipelines, a first pipeline of the at least two candidate machine learning pipelines includes a first machine learning algorithm, a hyperparameter optimization function, and a multi-function instruction set for feature extraction, feature transformation, and feature selection, and a second pipeline of the at least two candidate machine learning pipelines includes a second machine learning algorithm, and a neural network (NN) architecture and hyperparameter optimization function;

tuning the hyperparameters of the first machine learning algorithm and the second machine learning algorithm in parallel by a hybrid architecture based on:

the received selection of the at least one of the output one or more visualization features and bidirectional execution of the hyperparameter optimization function, the multi-function instruction set, and the NN architecture and hyperparameter optimization function;

outputting an automatically generated machine learning model based on the at least two candidate machine learning pipelines configured to perform the tuning of the hyperparameters, wherein:

the first pipeline, configured to perform the tuning of the hyperparameters, corresponds to a Bayesian Optimized based model learning pipeline, the second pipeline, configured to perform the tuning of the hyperparameters, corresponds to an evolutionary neural architecture search (NAS) pipeline, and the hybrid architecture comprises the first pipeline and the second pipeline, and is configured to increase a computational accuracy of a computing device by:

generating a priority score for each of the at least two candidate machine learning pipelines based on accuracy and build time to conserve computation resources; and generating the machine learning model by selecting a candidate machine learning pipeline of the at least two candidate machine learning pipelines that has a highest priority score among the at least two candidate machine learning pipelines;

executing model deployment to integrate the generated machine learning model into a production environment; and executing runtime monitoring to monitor a processor use and a memory consumption of the generated machine learning model.

16. The non-transitory computer readable storage medium of claim 15, wherein the operations further comprise performing, by the second pipeline, an evolution of a neural network architecture.

17. The non-transitory computer readable storage medium of claim 15, wherein the operations further comprise generating a third candidate machine learning pipeline comprising a neural network meta-learning pipeline.

18. The non-transitory computer readable storage medium of claim 15, wherein the operations further comprise ranking the at least two candidate machine learning pipelines based on a predetermined criterion.

* * * * *